Nov. 2, 1926.

C. G. TANZLER

ELECTRIC MACHINE

Filed Nov. 24, 1922    2 Sheets-Sheet 1

1,605,796

Carl G. Tanzler, INVENTOR.
BY Victor J. Evans,
ATTORNEY.

WITNESS:

Nov. 2, 1926.
C. G. TANZLER
1,605,796
ELECTRIC MACHINE
Filed Nov. 24, 1922    2 Sheets-Sheet 2
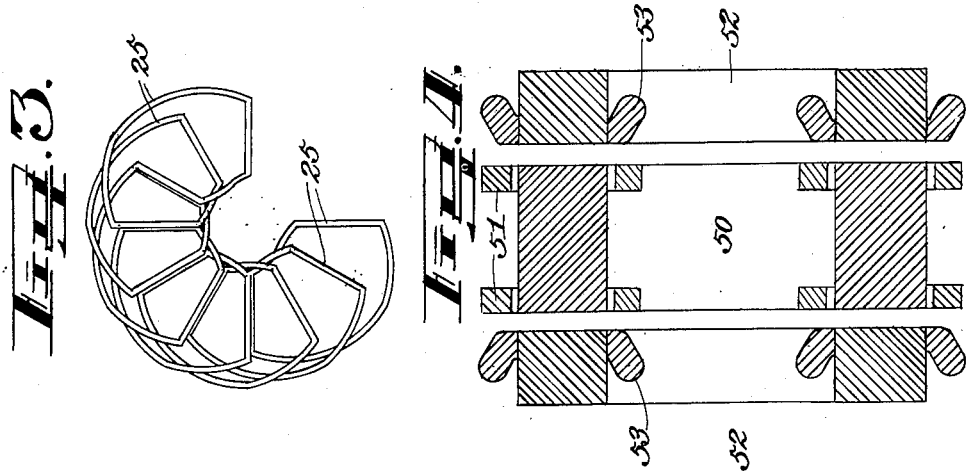
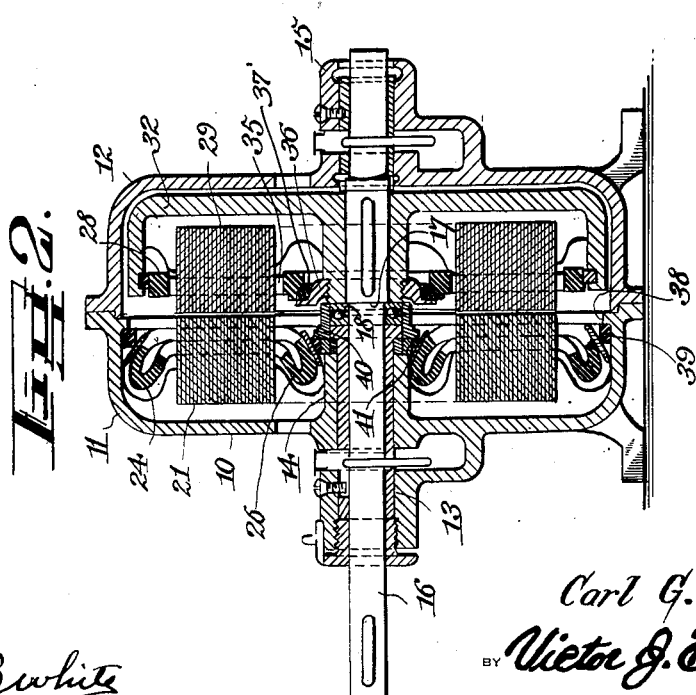
Carl G. Tanzler.
INVENTOR
BY Victor J. Evans.
ATTORNEY
WITNESS:

Patented Nov. 2, 1926.

1,605,796

UNITED STATES PATENT OFFICE.

CARL G. TANZLER, OF ELIZABETH, NEW JERSEY.

ELECTRIC MACHINE.

Application filed November 24, 1922. Serial No. 603,105.

This invention relates to electric machines such as motors and dynamos.

Some of the objects of the present invention are: to produce a more efficient and effectual machine of the character mentioned; to provide means for facilitating the removal of useless coils and armature of an electric machine and the substitution of new coils and a new armature; to minimize breakdowns; to have the air-space between the poles at a right angle to the axis of rotation so that wear of the bearings cannot result in the grinding of the poles; to maximize the cooling of the coils and armature; to maximize the pulling force or propelling drag because of increased leverage derived an advantage for machines intended for heavy continuous usage; and with these and other objects in view, the invention resides in the particular provision, construction and the relative disposition of the parts hereinafter fully described and illustrated in the accompanying drawings, in which:

Figure 2 is a longitudinal sectional view through the motor with the parts properly assembled.

Figure 3 is a diagrammatic view illustrating the manner in which the field-coils-unit is built.

Figure 4 is a diagrammatic view illustrating a modified arrangement of the field-coils-units on a stator and the armature units on the rotors.

Figure 1:
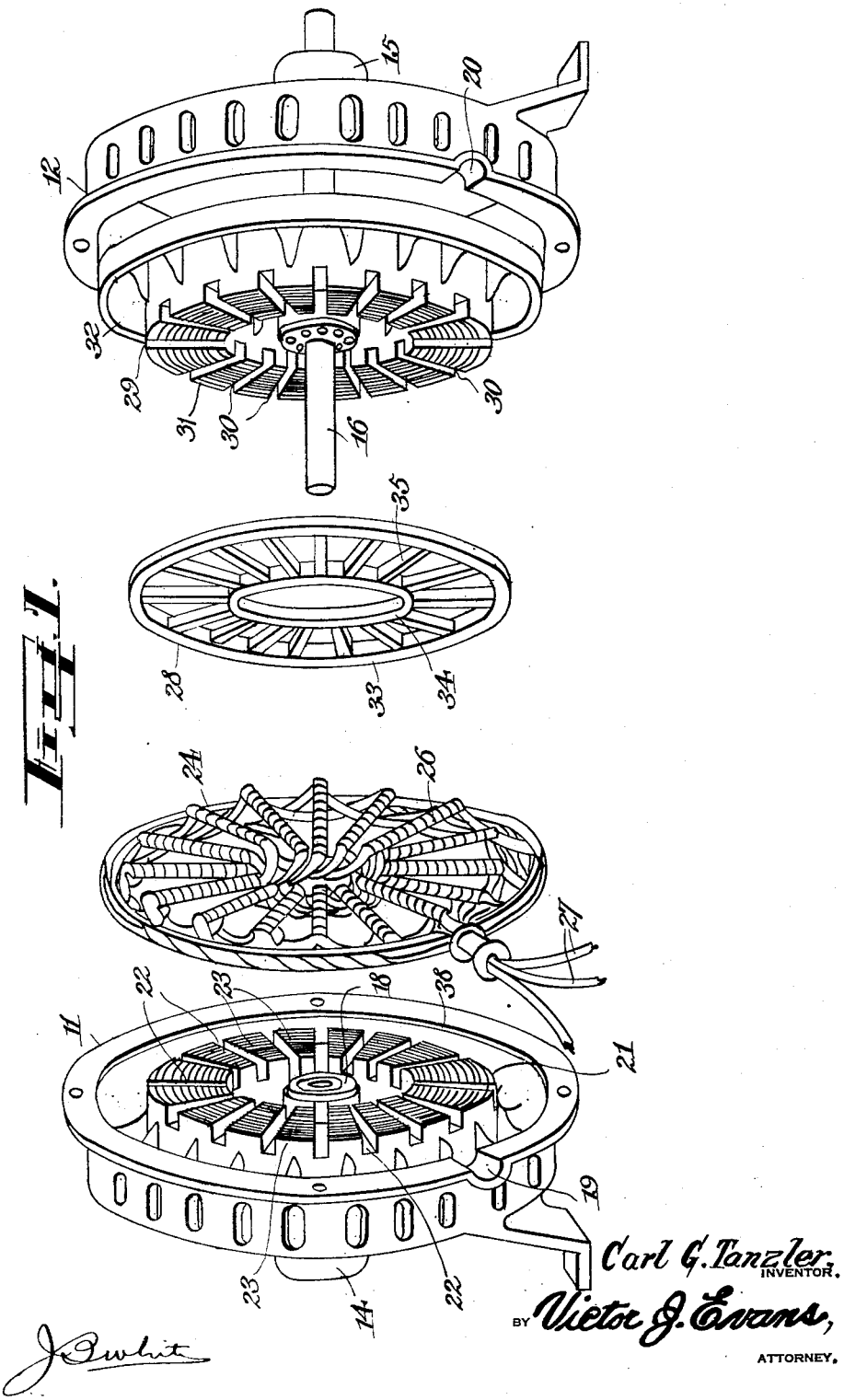
Figure 1 shows the main parts of a three-phase induction motor separated.

Referring now more particularly to Figures 1, 2 and 3, it will be apparent that, in one form of the present invention as a motor, it includes a frame 10 of separable sections 11 and 12 which are bolted together. The section 11 embodies a bearing 13 on the pulley or outer side thereof, and a bearing 14 on the inner side thereof. The section 12 has a bearing 15 on the outside thereof. The bearings 13, 14 and 15 support a shaft 16. The shaft 16 is reduced to provide a shoulder 17 which abuts a thrust bearing 18, which is attached to the inner portion of the bearing 14. The section 11 has a recess 19 therein which mates with a recess 20 in the section 12 for a reason to appear. The section 11 has arranged therein and attached thereto in any suitable manner a stator 21, which has a plurality of radially disposed grooves 22 in one face thereof to provide tapered portions 23. The stator 21 carries the field-coils unit 24.

The field-coils unit 24 comprises a plurality of elements 25 shown in Figure 3, and each of the elements 25 is made up of windings 26 in the form of radiating arms as shown in Figure 1. The elements 25 are taped to form a star-like unit as shown most clearly in Figure 1 of the drawings. The unit 24 as constituted and in virtue of the construction of the stator 21 is removably supported by the portions 23, and means hereinafter described serves to hold the unit 24 in place so that the same will not be dislodged. The leads 27 of the unit 24 are brought out through the opening formed by the recesses 19 and 20.

The armature winding of the present machine is in the nature of a wheel-like element 28 of copper. The said element 28 is carried by a rotor 29. In construction, the rotor is similar to the stator, in that it has grooves 30, radially disposed, to provide tapered portions 31. The rotor 29 is carried by a laterally flanged disk 32 which is keyed to the shaft 16. The element 28 being wheel-like has a rim 33, a rim 34, and members 35 which connect the rims as shown. The members 35 radiating from the rim 34 are equal in number to the number of grooves 30. When arranged on the rotor, the members 35 of the element 28 are disposed in the grooves 30, and a ring 36 threaded to the inner end of the hub of the disk 32, and an insulator 37 disposed in a flange of the disk 32 serve to hold the element 28 in operative position, but allows the element to be readily removed.

The unit 24 is held in place by an inwardly extending circumferentially disposed flange 38 on the inner edge of the section 11, a ring insulator 39 engaging the flange, a ring 40, removably attached to the bearing portion of the section 11, and an insulator 41.

The modification shown in Figure 4 consists of a rotor 50 having armature windings 51 similar to the armature 28, on each side thereof, and a stator 52 similar to the stator 21, at each side of the rotor 50 with a field-coils unit 53 similar to the field-coils unit 24, on one side of each of the stators 52. This type of machine the magnetic side thrust at each side of the rotor would be equal, therefore, a thrust bearing such as is shown in the other form of the invention could be omitted.

It is to be understood that the features of the invention though shown as embodied in a motor may be employed in other forms of electric machines such as dynamos.

What is claimed is:

1. An electric machine comprising a rotor having a wheel like armature winding which includes spaced inner and outer rims, members radiating from the inner rim and having their ends secured to both rims, said rotor being formed with radially disposed grooves providing tapered portions, said grooves receiving said members of the wheel like armature winding, a laterally flanged disk, a hub included in said disk, a ring threaded to the hub and secured thereto, an insulator ring arranged in a groove formed in the flange of the disk and said ring, tapered portions and insulator ring serving to support said armature winding in the grooves, and a stator including a field coils unit, cooperatively associated with the rotor.

2. An electric machine of the character described comprising a sectional casing, bearings included in each section, a shaft transversing the casing and received in said bearings, a stator arranged in one section and being formed with radially disposed grooves to form tapered portions, a field coils unit including radiating arms mounted in the grooves, a flange circumferentially formed on the inner edge of the section housing the stator, a ring insulator engaging the flange, a ring secured to the bearing portion last mentioned of the stator, said ring insulator and ring respectively removably supporting the field coils unit in operative association with the tapered portions, and a rotor carried by the shaft and including an armature winding in the other section for cooperating with the stator and field coils unit thereof.

In testimony whereof I hereby affix my signature.

CARL G. TANZLER.